United States Patent
Xu et al.

(10) Patent No.: US 7,930,491 B1
(45) Date of Patent: Apr. 19, 2011

(54) MEMORY CORRUPTION DETECTION SYSTEM AND METHOD USING CONTINGENCY ANALYSIS REGULATION

(75) Inventors: Jun Xu, Cupertino, CA (US); Chen Li, Sunnyvale, CA (US); Xiangrong Wang, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 210 days.

(21) Appl. No.: 11/058,886

(22) Filed: Feb. 16, 2005

Related U.S. Application Data

(63) Continuation-in-part of application No. 10/827,048, filed on Apr. 19, 2004, now Pat. No. 7,293,142.

(51) Int. Cl.
*G06F 12/00* (2006.01)
(52) U.S. Cl. ............ 711/154; 711/170; 711/210; 714/5; 714/42; 714/54
(58) Field of Classification Search .................. 711/170, 711/154, 210; 714/42, 54, 5
See application file for complete search history.

(56) References Cited

U.S. PATENT DOCUMENTS

| | | | | |
|---|---|---|---|---|
| 5,559,980 | A * | 9/1996 | Connors et al. | 711/100 |
| 5,590,329 | A | 12/1996 | Goodnow, II et al. | 717/144 |
| 5,689,707 | A | 11/1997 | Donnelly | 707/206 |
| 5,842,019 | A * | 11/1998 | Kolawa et al. | 717/130 |
| 5,911,073 | A | 6/1999 | Mattson, Jr. et al. | 717/104 |
| 5,953,530 | A | 9/1999 | Rishi et al. | 717/127 |
| 6,085,029 | A | 7/2000 | Kolawa et al. | 714/38 |
| 6,126,329 | A | 10/2000 | Bennett et al. | 717/127 |
| 6,154,128 | A | 11/2000 | Wookey et al. | 340/506 |
| 6,182,249 | B1 | 1/2001 | Wookey et al. | 714/47 |
| 6,237,114 | B1 | 5/2001 | Wookey et al. | 714/47 |
| 6,523,141 | B1 * | 2/2003 | Cantrill | 714/48 |
| 6,560,773 | B1 | 5/2003 | Alexander, III et al. | 717/128 |
| 6,618,824 | B1 | 9/2003 | Hastings | 714/35 |
| 6,634,020 | B1 | 10/2003 | Bates et al. | 717/131 |
| 6,654,903 | B1 * | 11/2003 | Sullivan et al. | 714/4 |
| 6,658,652 | B1 | 12/2003 | Alexander, III et al. | 717/128 |
| 6,718,485 | B1 | 4/2004 | Reiser | 714/38 |
| 6,799,200 | B1 * | 9/2004 | Blackmore et al. | 709/212 |
| 7,181,476 | B2 * | 2/2007 | Lee et al. | 707/203 |
| 2004/0059878 | A1 * | 3/2004 | Madany | 711/154 |
| 2004/0172513 | A1 * | 9/2004 | Nelson | 711/170 |
| 2004/0221120 | A1 * | 11/2004 | Abrashkevich et al. | 711/170 |
| 2005/0289307 | A1 * | 12/2005 | Achanta et al. | 711/159 |

OTHER PUBLICATIONS

The Oxford Handbook of Memory, *Chapter 4, Contingency Analyses of Memory*, Author: Michael J. Kahana, Oxford University Press, 2000, pp. 59-72.
Cal Erickson, "Memory Leak Detection In Embedded Systems," Linux Journal, Sep. 1, 2002; 5 pages; http://www.linuxjournal.com.
Cal Erickson, "Memory Leak Detection in C++," Linux Journal, Jun. 1, 2003, 5 pages, http://www.linuxjournal.com.

(Continued)

*Primary Examiner* — Stephen C Elmore
*Assistant Examiner* — Arpan P. Savla
(74) *Attorney, Agent, or Firm* — Campbell Stephenson LLP

(57) ABSTRACT

Systems, methods, apparatus and software can be implemented to detect possible instances of memory corruption. By analyzing memory blocks stored in a memory, provided in a snapshot file, or provided in a core dump, implicit and/or explicit contingency chains can be obtained. Analysis of these contingency chains identifies potential memory corruption sites, and subsequent verification provides greater confidence in the identification.

23 Claims, 3 Drawing Sheets

OTHER PUBLICATIONS

Jun Xu, Xiangrong Wang, Christopher Pham, "Less Intrusive Memory Leak Detection Inside Kernel," (Fast Abstract ISSRE 2003); 14$^{th}$ IEEE International Symposium on Software Reliability Engineering (ISSRE 2003); Denver, Colorado; Nov. 17-20, 2003; Chillarege Press; Copyright 2003 (2 pages).

Xiangrong Wang, Jun Xu, Christopher H. Pham, "An Effective Method to Detect Software Memory Leakage Leveraged from Neuroscience Principles Governing Human Memory Behavior," 15$^{th}$ International Symposium on Software Reliability Engineering (ISSRE 2004), Saint Malo, Bretagne, France, Nov. 2-5, 2004 (11 pages).

* cited by examiner ent application is a continuation-in-part of U.S. patent
MEMORY CORRUPTION DETECTION SYSTEM AND METHOD USING CONTINGENCY ANALYSIS REGULATION This application is a continuation-in-part of U.S. patent application Ser. No. 10/827,048, entitled "Memory Leak Detection System And Method Using Contingency Analysis," filed Apr. 19, 2004 now U.S. Pat. No. 7,293,142, and naming Jun Xu, Xiangrong Wang, Christopher Pham, Srinivas Goli as the inventors. The above-referenced application is hereby incorporated by reference herein in its entirety.

BACKGROUND OF THE INVENTION

1. Field of the Invention

The present invention relates to testing of hardware and software, and particularly to the detection and identification of memory corruption in software.

2. Description of the Related Art

In any computing system, including general purpose computer systems and embedded systems, resource management generally and memory management in particular are very important to proper system operation. In any computing system, memory management typically occurs at several levels, e.g., hardware memory management, operating system (OS) memory management, and application memory management. OS and application memory management rely on various software techniques for allocation and deallocation of memory used by the system. In the OS, memory is allocated to user programs, and reused by other programs when it is no longer required. Application memory management typically involves supplying the memory needed for a program's objects and data structures from the limited resources available, and recycling that memory for reuse when it is no longer required.

In general, as memory allocation techniques have become more sophisticated, the nature of memory allocation errors have become more complex. For example, with static allocation (used in many early systems and in languages such as Fortran) all data structure names are bound to storage locations at compile-time and the bindings do not change at run-time. Although static allocation imposes significant limits on program flexibility, it reduces the complexity associated with debugging memory allocation errors. Various forms of dynamic memory allocation, both for stack memory and heap memory are more commonly used today. However, to support dynamic allocation, OS's and application programs utilize additional code to handle their changing memory requirements because they cannot in general predict in advance how much memory they are going to require. For example, when a program requests a block of memory, a memory manager will allocate that block out of the larger blocks it has received from the operating system. This allocation is performed by some combination of OS or kernel level memory management software and memory management software associated with the application itself, e.g., allocation and deallocation functions such as the C functions malloc ( ) and free ( ).

One common form of memory allocation error is memory corruption, which can be a major resource issue leading to many system malfunctions and negative performance impacts. In software systems, memory corruption occurs when a process writes into illegal or invalid memory blocks. Some memory blocks may be illegal/invalid to all processes, while others may be illegal/invalid to only certain process because, for example, these blocks belong to the OS kernel or other processes. Memory corruption usually results in anomalous software behaviors or outright system crash, and is notoriously difficult to debug using conventional debugging techniques. Memory corruption can occur via a number of different scenarios including: (1) due to coding error, a process accidentally writes into unintended memory blocks (even if the block does belong to the same process); (2) a process uses an invalid pointer (e.g., to a block that is already freed) to write into the pointed memory block; (3) a process attempts to write into a memory block header (or other restricted or reserved region) that is managed by the OS; and (4) a process attempts to write into a low memory address, typically due to null pointer reference and its variations. Numerous other memory corruption sources exist. Moreover, reckless use of dynamic memory allocation can lead to memory management problems, which cause performance degradation, unpredictable execution or crashes.

Various tools currently exist to detect memory corruption. These tools typically work by detecting various illegal memory access problems such as array boundary errors, accessing through dangling pointers, and uninitialized memory reads. Examples of existing memory corruption detection tools include IBM's Rational Purify and PurifyPlus, Parasoft's Insure++, and various open source tools such as Valgrind. These tools typically use some combination of code instrumentation, instruction set emulation, and/or runtime pointer tracking (e.g., with enhanced implementations of memory allocation functions like malloc and free) for corruption validation. Because of the nature of these implementations, users must frequently to recompile source code or suffer significant performance reductions because of tool overhead. Also, these tools generally deliver very detailed reports which make filtering and retrieving of relevant information difficult for inexperienced users. Finally, these tools are often ill-suited for use with proprietary operating systems and/or embedded operating systems such as Cisco IOS.

Accordingly, it is desirable to have memory corruption detection and analysis tools and methods that are compact, less intrusive, pose low performance impact, are efficient, and present a low rate of false-positive results.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

Figure 1:
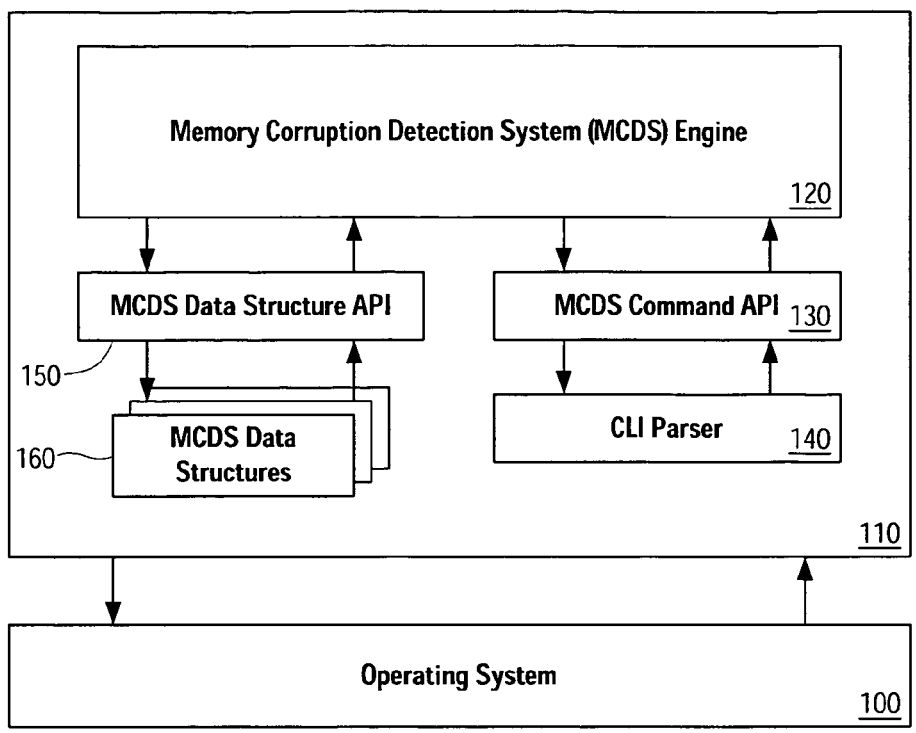
FIG. 1 is a simplified block diagram of a memory corruption detection system.

The following sets forth a detailed description of at least the best contemplated mode for carrying out the one or more devices and/or processes described herein. The description is intended to be illustrative and should not be taken to be limiting.

Although there are a number of techniques for identifying potential instances of memory corruption, existing memory corruption detection algorithms do not adequately satisfy address the problems identified above. In order to both improve memory corruption detection systems, both directly by improving the algorithms and indirectly by improving the manner in which the algorithms are adjusted or "fine-tuned", certain neuroscience concepts and principles have been applied to memory corruption detection. In particular, the present application takes advantage of concepts described by Michael Kahana in "Contingency Analyses of Memory," pp. 59-72, *The Oxford Handbook of Memory*, Oxford University Press, 2000, which is hereby incorporated herein by reference in its entirety.

In general, the contingency analysis described by Kahana is used to assess the relationship between the results from different types of tests of human memory. One goal of the analysis is to determine if the memory mechanisms targeted by the different types of tests share certain features or are instead more likely to be unrelated. As demonstrated by Kahana, contingency analysis techniques can used to select among various memory tests to isolate those tests that are more likely targeting the same mechanism or mechanisms. In so doing, contingency analysis can lead to the selection, modification, and use of the testing techniques most suited for determining a particular memory related characteristic. Additionally, contingency analysis of human memory suggests certain types of tests to be performed when analyzing non-human memory.

For example, Kahana examines a number of tests of successive memory tasks including item recognition, cued recall, tests of episodic memory using identical cues, and tests of episodic memory using cues containing identical information. Kahana shows that successive tests of episodic memory with identical cues or cues containing identical information demonstrate very high dependencies using the Yule's Q measure of correlation (described below). Thus, by applying contingency analyses to the relationship between recognition and recall, researchers have shown that experimental variables that have a significant effect on overall levels of performance do not seem to affect the task-to-task contingencies. Although Kahana's analysis is aimed at gaining insight into human memory, similar principles can be applied to computer memory for both detecting possible memory corruption and assessing the level of confidence in a particular possible instance of memory corruption.

To illustrate the use of contingency analysis, Kahana describes examining the relationship between recognition and recall at the level of individual subject items. Subjects study pairs of items (A-B) and are then given two successive tests: an item recognition test followed by a cued recall test. In the recognition test, an experimenter present B items from the studied pairs intermixed with non-studied items (lures). Subjects judge each item as a target or a lure. In cued-recall tests, subjects attempt to recall the B items given the A items as cues. Because the results cannot be averaged over subjects or items, a contingency table is computed. The table below illustrates an example of such a contingency table:

|        |   | Test 1 |   |
|--------|---|--------|---|
| Test 2 |   | 1      | 0 |
|        | 1 | A      | B |
|        | 0 | C      | D |

Because the test outcomes are binary variables (1=yes, and 0=no), subject-item correlation can be computed between test 1 (e.g., the recognition test) and test 2 (e.g., the recall test) by tabulating the data in the contingency table. Each of the values A-D represents the tally of results for that category.

Yule's Q is a common measure of correlation for 2×2 contingency tables, and is calculated by evaluating $Q=(AD-BC)/(AD+BC)$. The value Q can range from $-1$ (perfect negative correlation) to $+1$ (perfect positive correlation). Thus, Yule's Q is used to study agreement among ratings of multiple statistical parameters, experts, diagnostic tests, etc. Intuitively, it shows the relative increase in the odds of one test leading to a certain result, given that the other test yielded the same result. The value is invariant regardless of whether one is concerned with positive or negative rating, or which test is the reference. While such analysis may not provide direct information about the underlying mechanisms tested by each test, it does provide some information about the probability that two test are testing related mechanisms, assuming that the mechanisms have the same effect on both tests. Although Yule's Q is the example illustrated here, one having ordinary skill in the art will readily recognize that a variety of different correlational measures can be used in contingency analysis.

To apply these techniques to the problem of memory corruption detection, certain parallels should be identified. Kahana's analysis is based on using memory cues and the level of recognition and recall to determine, among other things, the likelihood that the two tests are testing for the same (or a similar) underlying mechanism. In the case of memory corruption detection, two different tests can be employed to determine if a particular memory block is corrupted. Contingency analysis can be used to help determine: (1) which tests among all the possible tests are best suited to be used together, and (2) in some specific cases, a confidence level in the determination based on the two tests. Additionally, as will be seen below, the nature of the tests and their relationship to each other will generally dictate specific possible outcomes and the manner in which Kahana's analysis is applied.

In the case of computer memories and operating systems, there are many objects that can possibly have several associated dependencies. For example, if the object is a pointer to a memory block, the pointer has dependencies such as: other pointers/addresses, global variables that store the value and/or variation of the pointer, etc. If the object is an address to a pointer, the dependencies can be even more detailed. The dependencies collectively form the contingency, that is a dependency relationship, among objects. In general, these dependencies can be evaluated using results from a test that corresponds to Kahana's recall test. The dependencies collectively form the so-called contingency chain, which represents the dependent relationship among objects. Knowledge about the chain is based on one or more of: the system memory map as it evolves over time, a snap shot of the memory, map, and memory information represented in core dumps produced by an OS during fault conditions.

In more specific examples, one can examine the manner in which memory is managed in a particular OS. In the present application, examples will emphasize use of Cisco IOS software. Many network devices such as line cards, network switches, switch-routers, routers, router-switches and storage network devices produced by Cisco Systems, Inc., operate using Cisco IOS software. Cisco IOS software is system software that provides common functionality, scalability, and security for a variety of devices, and allows centralized, integrated, and automated installation and management of inter-networks while ensuring support for a wide variety of protocols, media, services, and platforms. The IOS represents an operating system used by embedded systems, in contrast to operating systems like Unix, Linux, and Windows which are more commonly (although not exclusively) used in general purpose computer systems such as PCs, workstations, and servers. Thus, although many of the examples disclosed in this application emphasize embedded applications generally, and use in the IOS environment in particular, those of ordinary skill in the art will readily recognize that the systems, methods, and software described herein can generally be used with any type of computing system.

A variety of different elements used in IOS memory management can serve as cues. Examples include: addresses to or bit patterns of pointers to any part of system memory, the addresses to or bit patterns of specific pointers such as the address values associated with malloc ( ) function calls used to allocate specific blocks of memory, the variation of address values (e.g., offset, range) of the various memory blocks, and other blocks from other OS memory data structures (e.g., a "chunk" which is a memory block which organizes its own elements for fast and small memory requests). Still other elements used in IOS memory can serve to measure the level of recall. One example in IOS is the correlation of a block in use with the cue's value, where, for example, the cue values are stored in a BSS area of memory (as described below). Other IOS memory management elements can serve to measure the level of recognition. For example, the validity of a memory block can be measured against its existence in IOS memory management lists. Moreover, recognition can be measured based on the presence (or absence) of a memory block on particular types of IOS memory management lists, such as an allocated block list, a free block list, a restricted or reserved block list, etc.

In general, maximizing the levels of recognition and recall provide higher memory corruption detection yields, i.e., less false-positive outcomes. As will be described in greater detail below, both software successive memory tasks analysis and successive memory tests of episodic memory with identical cues or cues containing similar identification can be used to identify memory corruption candidates. In general, the former technique is used when the number of memory blocks being allocated is relatively small (e.g., on the order of 10,000 in a typical IOS implementation), and thus the analysis time will not be severely impacted. The latter technique can be used when the number of memory blocks being allocated exceeds a user's allowed time threshold. The number of blocks or complexity of the memory system can also affect decisions to perform the analysis in an on-line manner (e.g., while a system is running) or in an off-line manner (e.g., with a memory snap shot or core dump subsequent to a fault condition). The software and techniques described herein can generally be used in on-line and/or off-line implementations.

FIG. 1 is a simplified block diagram of a memory corruption detection system. The memory corruption detection system can be part of other memory use debugging systems such as the memory leak detection system described in the aforementioned '048 patent application, or it can be a standalone system as illustrated. Memory corruption detection system (MCDS) 110 typically operates in conjunction with a device's operating system 100, e.g., it utilizes memory management services provided by the OS, but can be integrated into the OS in some implementations. At the heart of MCDS 110 is the MCDS Engine 120. MCDS Engine 120 interfaces with one or more application programming interfaces (APIs) (MCDS data structure API 150 and MCDS command API 130) as well as with operating system 100. In general, MCDS Engine 110 fulfills a number of tasks to implement and support various memory corruption detection algorithms. For example, MCDS 110 handles requests from command line interface (CLI) parser 140, provides memory corruption reports to users, initialized and updates MCDS data structures 160, and performs corruption detection in designated memory areas with reduced impact on system operation (on-line case), or by operating on memory snapshots or core files (off-line case).

As noted above, the Cisco IOS provides an example of an OS such as OS 100. Such OSs typically provide services and functionality for process scheduling and management, memory management, and CPU and physical memory resource management. Moreover, OS 100 can support device drivers interfacing processes, the OS kernel, and various hardware elements. Because the environment in which OS 100 and MCDS 110 operate typically imposes a variety of resource restrictions, e.g., an embedded or real-time environment, MCDS 110 is preferably designed to minimize the impact on CPU and memory resources, at least when operating in an on-line manner. In one embodiment, MCDS 110 is designed to not interfere with the normal operations (e.g., network operations such as packet routing; packet forwarding, etc.) of the device. To accomplish this, MCDS 110 can be configured to follow a number of guidelines such as: yield to the CPU as often as possible; choose a relatively low process priority level at which to operate; reduce CPU expensive tasks; eliminate tasks which bring little value; preempt tasks when the analysis could lead to conclusion, and the like. Moreover, in some embodiments, MCDS 110 has full usage of the kernel memory management information and access privilege of any allocated memory block's contents, normally via kernel functions. If the kernel does not already provide this information, then the tool typically needs to provide the additional functionality to retrieve the block and pointer information.

MCDS data structures 160 can be used to store report information, track information on corrupt memory blocks, and track information on other memory related statistics, e.g., allocation statistics. Example data structures include: (1) memory type (enum)—this indicates the memory type under analysis because different memory types (heap memory vs. buffer memory) generally need different handling; (2) dynamic memory information—this data structure holds memory information from the time the MCDS was invoked to the current memory usage information; (3) corrupt memory information—this data structure holds information about corrupt memory blocks; and (4) memory allocation address—this data structure holds the address of the memory allocated from each instance of an allocation function. Numerous other data structures can be implemented and will generally be understood by those having ordinary skill in the art.

CLI Parser 140 allows a user to issue commands to control the memory corruption detection and analysis through, for example, a console connection or a telnet session. Commands implemented via CLI parser 140 and MCDS command API 130 are designed for activating MCDS 110, monitoring and maintaining MCDS 110, and in some cases debugging MCDS 110. For example, commands can be implemented to enable/restart memory corruption detection and clear all previous records, disable memory corruption detection, display the previous memory corruption report, if any, provide additional memory allocation information such as allocation counts for each program counter, and provide on demand analysis of the memory corruption with latest memory usage and update MCDS data structures 160. Numerous other commands can be implemented and will generally be understood by those having ordinary skill in the art. Moreover, some commands may be specific to on-line or off-line operation, e.g., specifying a core file for off-line examination. Although the system and commands illustrated are generally designed to provide on-demand memory corruption analysis via CLI, other types of analysis such as event-triggered analysis and scheduled analysis can also be implemented.

Since the goal of the MCDS is to help users identify memory corruption, it is important for MCDS 110 to be able to provide adequate information about memory corruption (and memory usage in general). To that end, MCDS 110 can be designed to provide a variety of different information depending on configuration and/or the specified type of report. The following is a non-exclusive list of the types of information that can be provided by MCDS 110 in association with its operation: caller program counter—address of the system call that allocated a memory block in question; caller name/ID—the name or identification of the process that owns a memory block; icount—the initial block count when MCDS is enabled (this number typically remains constant until MCDS 110 is reset) from each caller program counter; pcount—the previous block count from the last time that a corruption detection command was invoked; 1count—the current block count reported during current MCDS analysis; corrupted block—the hexadecimal value of a memory block pointing to a free or reserved/restricted part of memory; and erroneous address—the hexadecimal value of an address/pointer to the free memory block or reserved/restricted portion of memory pointed erroneously pointed to. Using this or other reported information, a user can determine the nature of the memory corruption, or at least the function/code line that caused the corruption to occur.

In some instances, memory corruption is detectable after the first invocation of MCDS 110. In other instances, it may be necessary, or desirable to invoke the MCDS multiple times and compare results. Thus, a user might establish certain test conditions for the device/program being tested, run MCDS 110, change or re-establish test conditions, re-run MCDS 110, etc.

The information reported by MCDS 110 depends in large part on the memory-related information accessible to the system. Such memory-related information includes, for example, memory management data from OS 100, memory-related information stored in each block, and memory information from snapshots and core dumps. In one embodiment, each allocated memory block includes, in addition to a user data area, certain header information about the block itself, related blocks, and the circumstances under which the block was allocated. Such header information can include: the block's address (e.g., a pointer value); the process ID/name of the process that caused the block's allocation; the program counter value corresponding to that allocation function invocation; a pointer to the next block in a chain of allocated blocks; a pointer to a previous block in a chain of allocated blocks; block size information; reference count information; and even de-allocation information. Free blocks can include information such a pointer to the next block in a chain of free blocks; a pointer to a previous block in a chain of free blocks; block size; and free block list membership. Moreover, upon identifying a corruption source (e.g., an other wise valid block that points in some manner to an unauthorized block or memory location) or a corruption target (e.g., the unauthorized block or memory location to which the corruption source points), MCDS 110 can use and display some or all of this information, including the complete contents of the relevant memory blocks.

In the implementation illustrated, all CLI commands access MCDS engine 120 via MCDS command API 130, so that there is no need to access the MCDS data structures from the CLI directly. In other implementations, API functionality can be eliminated or integrated into MCDS engine 120. However, the use of such APIs generally provides greater flexibility and scalability for the memory corruption detection system. Moreover, although the various components of MCDS 110 have been shown as separate entities, some or all of them can be combined in various ways as is well known to those having ordinary skill in the art.

Figure 2:
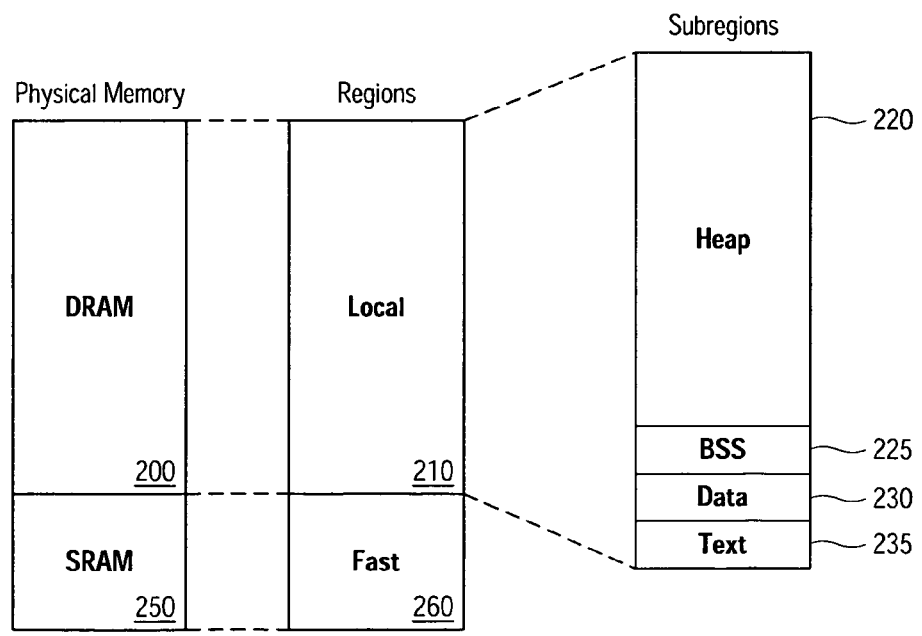
FIG. 2 is a simplified block diagram illustrating an example of memory organization in a device that uses a memory corruption detection system.

FIG. 2 is a simplified block diagram illustrating an example of memory organization in a device that uses MCDS 110. Again, the example of FIG. 2 is modeled after an embedded implementation of the Cisco IOS. In this example, the entire physical memory is mapped into one large flat virtual address space. No memory paging of swapping is performed, so this example does not illustrate a full virtual memory scheme. The address space is divided into areas of memory called regions which generally correspond to the various physical memories such as DRAM 200 and SRAM 250. Thus, local region 210 corresponds to DRAM 200 and fast region 260 corresponds to SRAM 250. Different types of physical memory might be present in the system because they are particularly suited for certain tasks. For example, SRAM 250 might be present for storing packets in a router, while DRAM 200 might be present for storing software and operational data. While the local region is typically used for normal run-time data structures and local heaps, other regions can serve more specialized purposes: fast (260)—associated with fast memory such as SRAM 250 and used for special purpose or speed-critical storage; iomem (not shown)—shared memory that is visible to both the CPU and other controllers over a data bus; itext (not shown)—executable OS code; and idata (not shown)—initialized variables; ibss (not shown)—uninitialized variables. Still other regions can be defined.

FIG. 2 also illustrates subregions 220-235. Subregions 220-235 provide a further level of flexibility in organizing and protecting memory. In general, classifying memory into regions and subregions allows the IOS to group various types of memory so software need not know about the specifics of memory on every platform. IOS manages available free memory via a one or more memory pools, which are essentially heaps in the generic sense. Each pool is a collection of memory blocks that can be allocated and deallocated as needed. Memory pools are built from one or more regions or subregions and are managed by memory management functionality of the kernel. In many instances, pools have a one-to-one correspondence with regions or subregions. So, for example, heap 220 can correspond to a single memory pool from which memory blocks are allocated and deallocated. In managing the memory blocks in a pool, the memory manager typically maintains list of available (free) memory blocks. As processes request memory, the memory manager allocates memory from the list. As memory blocks are freed by processes, the area becomes available again and is added back to the list of available blocks. While in many implementations, a single memory manager operates to control all memory related functions for the kernel, in this example there are typically separate memory managers for managing regions/subregions and memory pools. Again, it should be noted that the memory scheme illustrated in FIG. 2 is merely illustrative and a number of different methods for memory organization and management can utilize the memory corruption detection systems and methods described in the present application.

Because a computer system can typically have several different areas of memory, which may or may not correspond to different types of physical memory, MCDS 110 is generally designed to search for memory corruption in different memory areas. For example, in one embodiment, MCDS 110 searches for memory corruption in two different IOS memory management areas, the memory managed under the memory pool manager and a buffer area (used for storing data packets handled by routers, etc.) under a buffer manager. Although the discussion of memory corruption detection below will generally focus on analyzing the memory in the heap under the memory pool manager, it should be understood that the techniques described can be extended to other types of memory and/or other regions/subregions/pools of memory.

Figure 3:
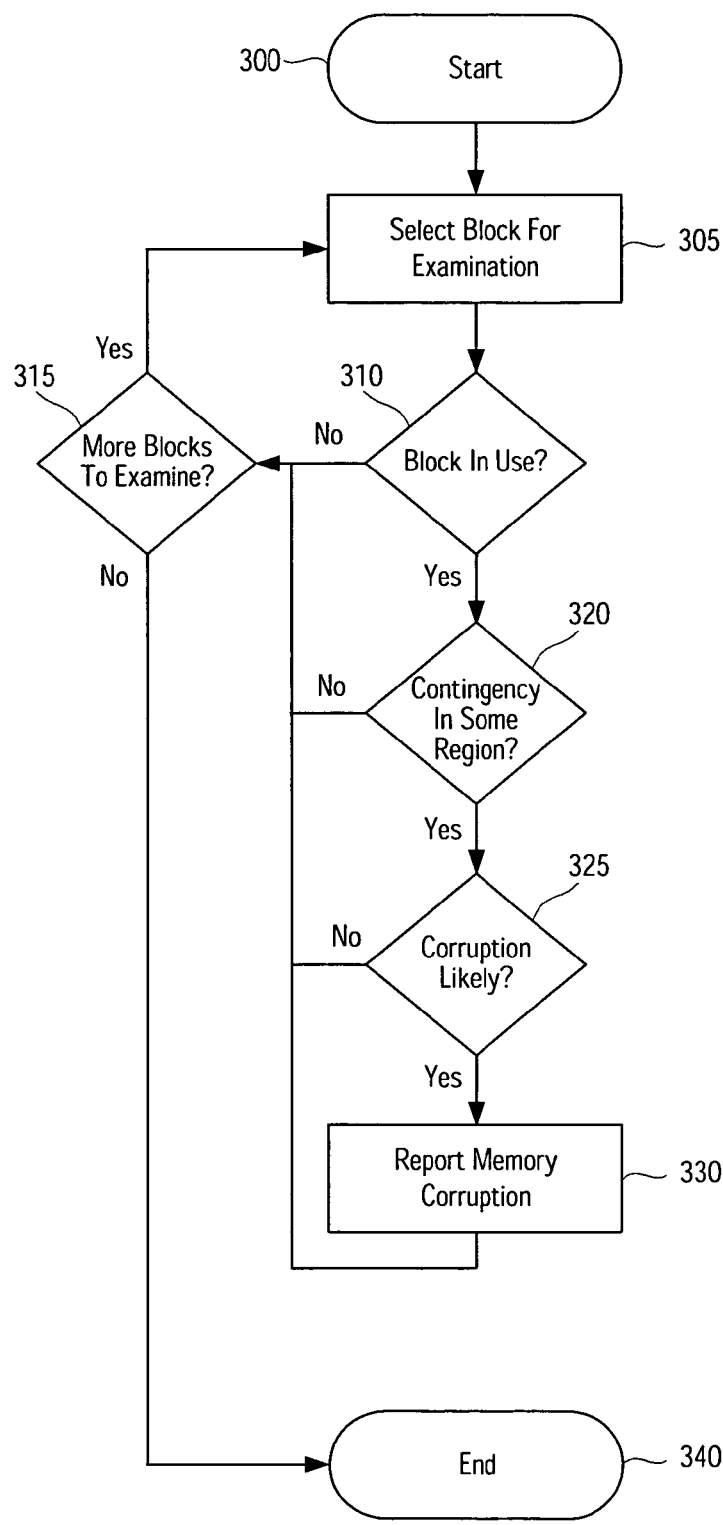
FIG. 3 is a flow chart illustrating techniques of the present invention.

FIG. 3 is a flow chart illustrating various memory corruption detection techniques that are used by memory corruption detection systems such as MCDS 110. As noted above, memory corruption can take various forms, but typically involves the aforementioned corruption source and corruption target. While it is typical for the term "corrupt memory" to refer to the corruption target, i.e., the portion of memory that can become corrupted by virtue of unauthorized access stemming from code or a memory reference in the corruption source, corruption sources are sometimes also referred to as corrupt memory. Thus, a corruption source typically causes a process to write into illegal or invalid memory locations. Memory locations can be illegal/invalid to some or all processes, and can include complete blocks, portions of blocks (e.g., header, tail, etc.), or even larger sections of memory (e.g., a process' stack). Additionally, the techniques illustrated in FIG. 3 can generally be applied to both online and offline implementations, the primary difference being the source of the memory information examined.

All allocated memory should be referenced from memory regions in certain forms, while unallocated memory and restricted/reserved portions of memory should not be referenced (except perhaps by memory management data structures such as a free block list). If a free block or other restricted/reserved portion of memory is referenced, that block is likely to be corrupted, or at least the possibility for corruption exists. Logically, the concept can be extrapolated so that valid memory blocks (e.g., blocks that are not corruption sources) should be successive from a few basic points in the format of referencing chains. Since the chains are built based on the successive memory reference, they can be referred to as a contingency chain, i.e., in keeping with the application of contingency analysis to memory corruption detection. Two basic methods for constructing contingency chains are: (1) Memory scan/search (FIG. 3). Each valid memory region (e.g. heap) should be searched to implicitly form the contingency chain. In general, this implementation could be slow, but it is less complicated and consumes less memory. (2) Explicitly build the chains. Although not described in the present application, examples of explicit contingency chain construction (in the context of memory leak detection) are illustrated in the '048 patent application. Thus, construction of contingency chains can take a variety of forms, and can focus on contingencies among allocated memory blocks (e.g., references outside of valid memory blocks are suspect) or contingencies among free blocks. For example, a free block contingency chain can be constructed in a manner similar to the allocated block contingency chain described in the '048 patent application. Variations and combinations of these basic techniques will be known by those having ordinary skill in the art.

Whichever technique is utilized, there are several contingency chains to be built (either implicitly or explicitly) before proceeding to the memory corruption identification. These chains are generally different from kernel memory management information lists, and will be used to compare to the kernel memory management information lists in order to detect and verify memory corruption. Thus, in the comparison of the contingency chains with the memory management information lists, if a block is in the contingency chains but is somehow associated with free, reserved, or illegal memory, it is considered as a corruption candidate. Due to the volatility of memory usage, in some embodiments revalidation is implemented for confirming a potential corruption and reducing the chances of falsely identifying a memory corruption instance.

FIG. 3 is a flow chart illustrating one technique for memory corruption detection. In this example, an "implicit" contingency chain is analyzed, i.e., the "building" of this contingency chain leverages the records maintained by OS memory management to determine whether an "invalid" area of memory is being referenced in any possible memory regions. No explicit contingency chain is built and no such record is kept in memory after the analysis is completed, with the idea that the contingency is a digestion of the memory usage from the memory map, and thus the memory map itself can also be used directly. This technique is useful where there is small number, e.g., in the range of thousands, of elements. This approach however can be slow if there are high numbers of elements, for example ten thousand or more allocated memory blocks. Using some relevant cues to examine allocated memory, e.g., an address, in an allocated block, referring to some portion of memory, the cue (or pattern) recall is said to be positive and associated memory corruption is a possibility. Further validation should then be performed. A part of the validation can be to check again whether the same pointer exists in one or more OS memory management lists.

In one embodiment, such memory analysis is implemented as follows. Operation begins at 300 and typically focuses on analyzing a single memory pool. However, if there are multiple pools or regions to be analyzed, the process illustrated in FIG. 3 can be repeated for each one as desired. In step 305 a particular memory block among those in the memory pool is selected as the target of examination. In one embodiment, memory block selection uses the OS's memory management information, e.g., a list of allocated blocks as seen by the kernel. In still another embodiment, block selection is performed by traversing the memory pool regardless of kernel memory management information. Next, it is determined whether the block is currently in use (310). In some implementations, the determination may have already been made by virtue of the manner in which the target block was selected, e.g., if the target block was selected from a memory management list, then it might be assumed that the OS believes the memory block to be allocated. In another example, the target block (or a corresponding memory data structure) can be examined directly, e.g., looking for a non-zero reference count, to determine if the memory block is allocated. If the target memory block is not allocated, operation transitions to 315 where it is determined whether there are additional blocks in the memory pool to examine. If so, operation returns to 305 where another target block is selected for examination. If not, all memory blocks in the pool have been examined and the process terminates at 340.

If the target memory block is in use as determined at 310, operation transitions to 320 where a determination is made if a contingency exists in some memory pool/region. In many implementations, a block allocated in one memory pool or region will not be referenced by and will not make reference to an object outside that pool or region. However, this need not be the case, so the analysis performed in step 320 can include examination of various different memory pools or regions. For example, while some implementations might only search the heap subregion 220 as illustrated in FIG. 2, other implementations can also allow examination of uninitialized variable region 225, and initialized variable region 230. Search for the contingency can take a variety of forms. For example, the pointer to the target block can be used to check the application memory space to confirm the existence, e.g., reference by another object, of the pointer under investigation. User data portions of memory blocks can be examined for memory addresses. Some operating systems may not have a well distinguished application memory space, and so all regions accessible by the application can be examined. In the examination process, the "cue" used is typically a bit pattern representing some or all of the relevant memory address. In some embodiments, care may need to be taken to distinguish data containing the cue from actual references to the portion of memory, because such errors can lead to false-positive results. Thus, for example, only block user data (and not block headers) might be searched. If there exists no reference to the memory space, then no contingency exists and operation transitions to 315 as described above. Any portion of memory for which reference can be found is a candidate for memory corruption, e.g., recall is said to be positive.

The memory corruption candidate is then verified (325). Verification is particularly important in systems where memory is routinely allocated and deallocated. Due to the dynamic nature of the OS at run time, the status of the corruption target may have changed during the analysis for contingency, and therefore verification (e.g., recognition tests) are implemented to check whether memory corruption is likely. While numerous different tests can be performed, one or more of the following three tests are most commonly performed: (1) determining, by reference to the memory management system's active or allocated block list, whether the referenced portion of memory is in an allocated block; (2) determining, by reference to the memory management system's free block list, whether the referenced portion of memory is in a free block; and (3) determining whether the referenced portion of memory is in some restricted portion of memory (e.g., a block header, a block tail, an address outside the address space, a program stack, etc.). This latter test can itself include one or more specific tests. For example, testing against block headers/tails can involve a comparison against known offset ranges from block addresses. Various other tests can be performed.

Thus, operation 325 can include one or more verification steps. If any one suggests the possible corrupted memory is not in fact corrupted, operation returns to 315. For example, if a block contains a reference to a free block, and the subsequent check of the reference against the memory management system's free block list indicates that the block is no longer free (e.g., it has be allocated in the interim), then memory corruption has not been verified. If, however, it is determined that the corruption source does point to an inappropriate portion of memory, operation transitions to 330 where the possible corruption is reported with whatever level of specificity is desired, selected, or configured into the memory corruption detection tool. The report can include information about the source, the target, and various other aspects of the state of system memory. Note that, if desired or necessary to improve confidence, follow-up verification steps can be performed prior to reporting. For example, further recall checking at the previous recall positive locations (i.e., the original reference in the corruption source) can be performed to confirm that the referencing points still exist. If not, the suspect memory is probably not corrupted. The process then returns to 315 to handle the next memory block. Note that in some cases, memory corruption information is "reported" in the sense that the information is stored in an appropriate data structure, e.g., MCDS data structures 160, and only presented to the user at the conclusion of the analysis for the appropriate memory region(s)/pool(s).

As noted above, the process illustrated in FIG. 3 may be repeated for a number of different regions, subregions, or memory pools. Additionally, the process can be designed to target different types of memory objects, e.g., conventional heap memory blocks, packets, packet headers, buffers, etc. Such variations can be incorporated, for example, into steps such as 320 just as that step can include examination of all "visible" memory regions.

The flow chart of FIG. 3 and the systems, methods, and techniques described herein illustrate some of the many operational examples of memory corruption detection system use disclosed in the present application. Those having ordinary skill in the art will readily recognize that certain steps or operations described or illustrated can be eliminated or taken in an alternate order. Moreover, the methods described and modules illustrated are typically implemented as one or more software programs for a computer system and are encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

The direct application of Kahana's contingency analysis, along with the use of correlational techniques such as Yule's Q, help to confirm desirable approaches to building memory corruption detection tools that provide high memory corruption detection yield. The statistic of successful analysis is generally confirmed by, for example, the Q number. In the process of developing the memory corruption detection tools, one can consistently build the contingency table to keep track number of occurrences of recognition (test 1) and recall (test 2) and their relationship to get the values for A, B, C, D. From those values, a Q value can be calculated as described above. The higher the Q value, the lower the noise level generated by the memory corruption detection tool. Using the Q value as a reference, memory corruption detection tool parameters can be adjusted to increase the likelihood of definite memory corruption detection. Note that the meaning of positive and negative outcomes to tests can vary significantly depending on the test. Thus, a given test might alternately be described as a recall or a recognition test depending on the nature of possible outcomes.

Although the examples above have generally emphasized embedded system applications, e.g., the operation of IOS on a network device, these same systems, methods, techniques, and software can be used in a variety of different computing systems.

Figure 4:
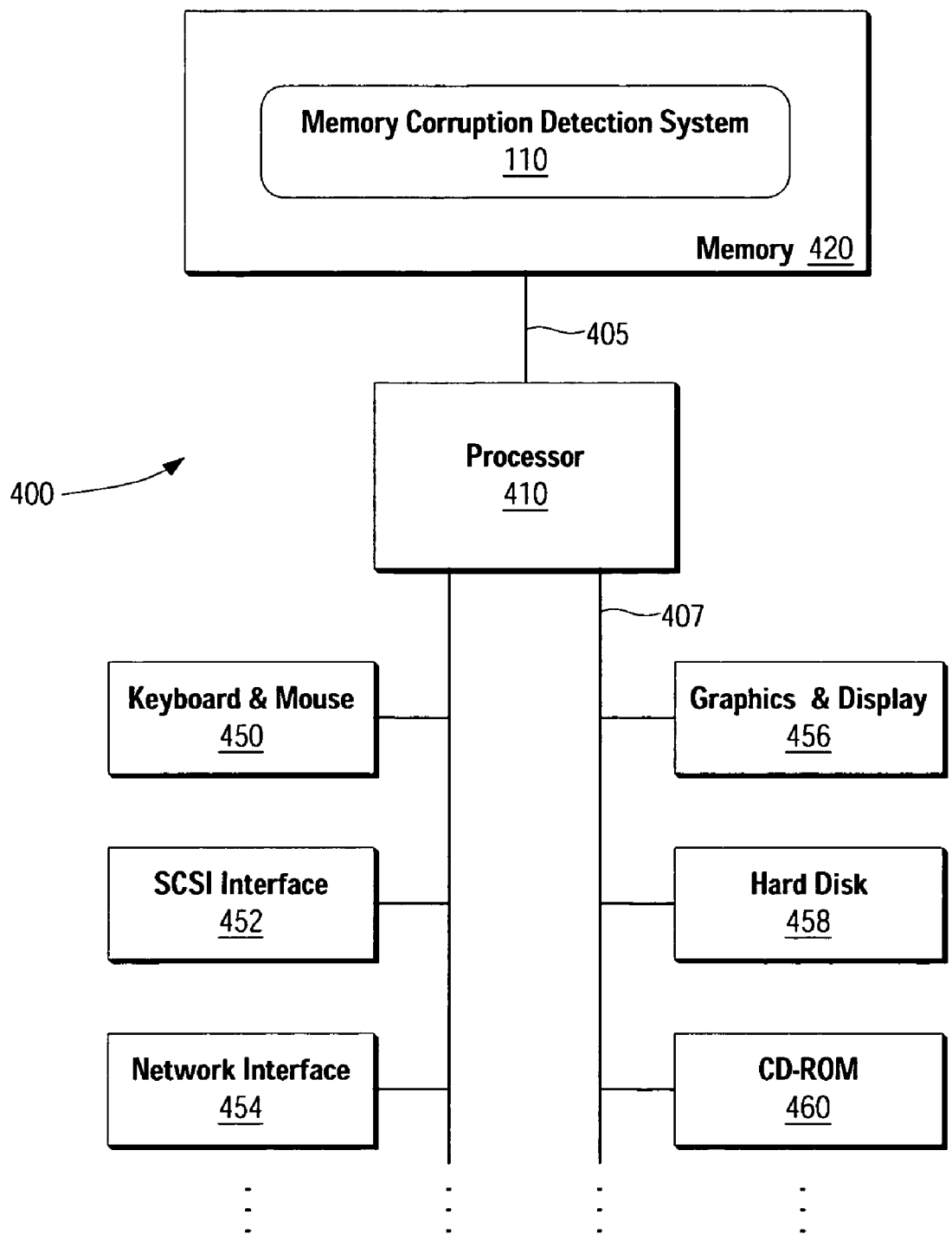
FIG. 4 is a block diagram of a computer system for implementing the techniques of the present invention.

For example, FIG. 4 illustrates a block diagram of a computer system 400 for implementing the memory corruption detection techniques of the present invention. For example, computer system 400 can be an embodiment of one of the previously described hosts. Computer system 400 includes a processor 410 and a memory 420 coupled together by communications bus 405. Processor 410 can be a single processor or a number of individual processors working together. Memory 420 is typically random access memory (RAM), or some other dynamic storage device, and is capable of storing instructions to be executed by the processor, e.g., MCDS 110. Memory 420 is also used for storing temporary variables or other intermediate information during the execution of instructions by the processor 410.

Those having ordinary skill in the art will readily recognize that the techniques and methods discussed below can be implemented in software using a variety of computer languages, including, for example, traditional computer languages such as assembly language, Pascal, and C; object oriented languages such as C++, C#, and Java; and scripting languages such as Perl and Tcl/Tk. Additionally, software 110 can be provided to the computer system via a variety of computer readable media including electronic media (e.g., flash memory), magnetic storage media (e.g., hard disk 458, a floppy disk, etc.), optical storage media (e.g., CD-ROM 460), and communications media conveying signals encoding the instructions (e.g., via a network coupled to network interface 454).

Computer system 400 also includes devices such as keyboard & mouse 450, SCSI interface 452, network interface 454, graphics & display 456, hard disk 458, and CD-ROM 460, all of which are coupled to processor 410 by communications bus 407. It will be apparent to those having ordinary skill in the art that computer system 400 can also include numerous elements not shown in the figure, such as additional storage devices, communications devices, input devices, and output devices, as illustrated by the ellipsis shown. An example of such an additional computer system device is a fibre channel interface.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. A method comprising:
   selecting a first allocated memory block from a plurality of allocated memory blocks;
   searching the first allocated memory block for a reference to a portion of memory;
   in response to finding the reference to the portion of memory in the first allocated memory block, determining that the reference to the portion of memory refers to at least one of: a free memory block, a non-allocated memory block, a restricted portion of memory, or an invalid portion of memory; and
   if the reference to the portion of memory in the first allocated memory block is at least one of: a free memory block, a non-allocated memory block, a restricted portion of memory, or an invalid portion of memory,
      verifying that the reference to the portion of memory still exists by examining at least a portion of the first allocated memory block, and
      reporting an address of the first allocated memory block as being related to possible memory corruption, wherein the reporting the address of the first allocated memory block as being related to possible memory corruption comprises:
         storing in a data structure: a program counter value, a process identification value, a process name, an initial block count, a previous block count, a current block count, the address of the first allocated memory block, contents of the first allocated memory block, a value of the reference to the portion of memory, an address of a memory block corresponding to the reference to the portion of memory, and contents of the memory block corresponding to the reference to the portion of memory.

2. The method of claim 1 wherein the determining that the reference to the portion of memory refers to at least one of: a free memory block, a non-allocated memory block, a restricted portion of memory, or an invalid portion of memory further comprises at least one of:
   examining free block memory management information maintained by an operating system;
   examining allocated block memory management information maintained by the operating system; and
   comparing the reference to the portion of memory with at least one memory block address.

3. The method of claim 1 wherein the reporting the address of the first allocated memory block as being related to possible memory corruption further comprises:
   displaying to a user: the program counter value, the process identification value, the process name, the initial block count, the previous block count, the current block count, the address of the first allocated memory block, the contents of the first allocated memory block, the value of the reference to the portion of memory, the address of the memory block corresponding to the reference to the portion of memory, and the contents of the memory block corresponding to the reference to the portion of memory.

4. The method of claim 1 wherein the selecting the first allocated memory block from the plurality of allocated memory blocks further comprises:
   selecting the first allocated memory block address from operating system memory management information.

5. The method of claim 1 wherein the first allocated memory block is located in at least one of a memory snapshot file and a core dump file.

6. The method of claim 1 wherein the first allocated memory block is located in a memory of a device executing an operating system.

7. The method of claim 1 further comprising:
   examining a contingency chain corresponding to one of the plurality of allocated memory blocks.

8. The method of claim 1 further comprising:
   forming a contingency chain for each of the plurality of allocated memory blocks.

9. A system comprising:
   a memory;
   a processor coupled to the memory; and
   a memory corruption detection system (MCDS) engine, wherein at least a portion of the MCDS engine is encoded as instructions stored in the memory and executable on the processor, and wherein the MCDS engine:
      searches a first allocated memory block for a reference to a portion of memory;
      in response to finding the reference to the portion of memory in the first allocated memory block, determines that the reference to the portion of memory refers to at least one of a free memory block, a non-allocated memory block, a restricted portion of memory, or an invalid portion of memory; and
      if the reference to the portion of memory in the first allocated memory block is at least one of: a free memory block, a non-allocated memory block, a restricted portion of memory, or an invalid portion of memory,
         verifies that the reference to the portion of memory still exists by examining at least a portion of the first allocated memory block, reports an address of the first allocated memory block as being related to possible memory corruption, and stores in a data structure: a program counter value, a process identification value, a process name, an initial block count, a previous block count, a current block count, the address of the first allocated memory block, contents of the first allocated memory block, a value of the reference to the portion of memory, an address of a memory block corresponding to the reference to the portion of memory, and contents of a memory block corresponding to the reference to the portion of memory.

10. The system of claim 9 further comprising at least one of an MCDS data structure application programming interface (API), an MCDS command API, an MCDS data structure, and a command line interface (CLI) parser stored in at least one of the memory and a storage device accessible by the processor.

11. The system of claim 9 wherein the MCDS engine further:
examines free block memory management information maintained by an operating system;
examines allocated block memory management information maintained by the operating system; and
compares the reference to the portion of memory with at least one memory block address.

12. The system of claim 9 wherein the MCDS engine further:
displays to a user the program counter value, the process identification value, the process name, the initial block count, the previous block count, the current block count, the address of the first allocated memory block, the contents of the first allocated memory block, the value of the reference to the portion of memory, the address of the memory block corresponding to the reference to the portion of memory, and the contents of the memory block corresponding to the reference to the portion of memory.

13. The system of claim 9 wherein the first allocated memory block is located in at least one of: a memory snapshot file, a core dump file, and the memory.

14. The system of claim 9 wherein the memory, the processor, and the MCDS engine are part of a network device.

15. A computer readable medium comprising program instructions executable on a processor, the computer readable medium being at least one of an electronic storage medium, a magnetic storage medium, and an optical storage medium, wherein the program instructions are operable to implement each of:
selecting a first allocated memory block from a plurality of allocated memory blocks;
searching the first allocated memory block for a reference to a portion of memory;
in response to finding the reference to the portion of memory in the first allocated memory block, determining that the reference to the portion of memory refers to at least one of: a free memory block, a non-allocated memory block, a restricted portion of memory, or an invalid portion of memory; and
if the reference to the portion of memory in the first allocated memory block is at least one of: a free memory block, a non-allocated memory block, a restricted portion of memory, or an invalid portion of memory,
verifying that the reference to the portion of memory still exists by examining at least a portion of the first allocated memory block, and reporting an address of the first allocated memory block as being related to possible memory corruption, and
storing in a data structure: a program counter value, a process identification value, a process name, an initial block count, a previous block count, a current block count, the address of the first allocated memory block, contents of the first allocated memory block, a value of the reference to the portion of memory, an address of a memory block corresponding to the reference to the portion of memory, and contents of the memory block corresponding to the reference to the portion of memory.

16. The computer readable medium of claim 15 wherein the determining further comprises program instructions operable to:
examine free block memory management information maintained by an operating system;
examine allocated block memory management information maintained by the operating system; and
compare the reference to the portion of memory with at least one memory block address.

17. The computer readable medium of claim 15 wherein the reporting further comprises program instructions operable to perform:
displaying to a user: the program counter value, the process identification value, the process name, the initial block count, the previous block count, the current block count, the address of the first allocated memory block, the contents of the first allocated memory block, the value of the reference to the portion of memory, the address of the memory block corresponding to the reference to the portion of memory, and the contents of the memory block corresponding to the reference to the portion of memory.

18. The computer readable medium of claim 15 wherein the first allocated memory block is located in at least one of a memory snapshot file and a core dump file.

19. The computer readable medium of claim 15 wherein the first allocated memory block is located in a memory of a device executing an operating system.

20. The computer readable medium of claim 15 further comprising program instructions operable to perform:
examining a contingency chain corresponding to one of the plurality of allocated memory blocks.

21. The computer readable medium of claim 15 further comprising program instructions operable to perform:
forming a contingency chain for each of the plurality of allocated memory blocks.

22. An apparatus comprising:
a means for selecting a first allocated memory block from a plurality of allocated memory blocks;
a means for searching the first allocated memory block for a reference to a portion of memory;
a means for determining that the reference to the portion of memory refers to at least one of: a free memory block, a non-allocated memory block, a restricted portion of memory, or an invalid portion of memory, in response to the reference to the portion of memory being found in the first allocated memory block;
a means for verifying that the reference to the portion of memory still exists by examining at least a portion of the first allocated memory block, if the reference to the portion of memory in the first allocated memory block is at least one of: a free memory block, a non-allocated memory block, a restricted portion of memory, or an invalid portion of memory;

a means for reporting an address of the first allocated memory block as being related to possible memory corruption, if the reference to the portion of memory in the first allocated memory block is at least one of: a free memory block, a non-allocated memory block, a restricted portion of memory, or an invalid portion of memory; and a means for storing in a data structure: a program counter value, a process identification value, a process name, an initial block count, a previous block count, a current block count, the address of the first allocated memory block, contents of the first allocated memory block, a value of the reference to the portion of memory, an address of a memory block corresponding to the reference to the portion of memory, and contents of the memory block corresponding to the reference to the portion of memory.

23. The method of claim 1 further comprising:

copying the plurality of allocated memory blocks subsequent to a fault condition and prior to the selecting, the searching, the determining, the verifying, and the reporting.

* * * * *